United States Patent
Bai (10) Patent No.: US 8,509,991 B2
(45) Date of Patent: Aug. 13, 2013

(54) METHOD OF ESTIMATING AN AIR QUALITY CONDITION BY A MOTOR VEHICLE

(75) Inventor: Sue Bai, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 12/751,184

(22) Filed: Mar. 31, 2010

(65) Prior Publication Data

US 2011/0246022 A1 Oct. 6, 2011

(51) Int. Cl.
*G06F 7/00* (2006.01)

(52) U.S. Cl.
USPC .......................................................... 701/36

(58) Field of Classification Search
USPC .......................................................... 701/36
See application file for complete search history.

(56) References Cited

U.S. PATENT DOCUMENTS

| | | | |
|---|---|---|---|
| 5,396,429 A | 3/1995 | Hanchett | |
| 5,670,714 A | 9/1997 | Sorenson | |
| 6,112,151 A | 8/2000 | Kruse | |
| 6,233,506 B1 | 5/2001 | Obradovich et al. | |
| 6,389,337 B1 | 5/2002 | Kolls | |
| 6,405,132 B1 | 6/2002 | Breed et al. | |
| 6,615,137 B2 | 9/2003 | Lutter et al. | |
| 6,615,186 B1 | 9/2003 | Kolls | |
| 6,720,920 B2 | 4/2004 | Breed et al. | |
| 6,820,897 B2 | 11/2004 | Breed et al. | |
| 6,853,894 B1 | 2/2005 | Kolls | |
| 6,856,820 B1 | 2/2005 | Kolls | |
| 6,895,310 B1 | 5/2005 | Kolls | |
| 7,003,289 B1 | 2/2006 | Kolls | |
| 7,031,663 B2 | 4/2006 | Heinonen et al. | |
| 7,174,243 B1 | 2/2007 | Lightner et al. | |
| 7,202,776 B2 | 4/2007 | Breed | |
| RE40,073 E | 2/2008 | Breed | |
| 7,418,346 B2 | 8/2008 | Breed et al. | |
| 7,421,321 B2 | 9/2008 | Breed et al. | |
| 7,502,672 B1 | 3/2009 | Kolls | |
| 7,554,440 B2 | 6/2009 | Kadaba | |
| 2004/0119609 A1 | 6/2004 | Solomon | |
| 2005/0053515 A1 | 3/2005 | Yates et al. | |
| 2005/0222755 A1* | 10/2005 | Tengler et al. | 701/201 |
| 2007/0243808 A1* | 10/2007 | Mathur et al. | 454/75 |
| 2008/0033644 A1 | 2/2008 | Bannon | |
| 2009/0192681 A1 | 7/2009 | Hayashi et al. | |

FOREIGN PATENT DOCUMENTS

| | | |
|---|---|---|
| DE | 102007007487 | 8/2008 |
| JP | 5195698 | 8/1993 |

* cited by examiner

*Primary Examiner* — Thomas Tarcza
*Assistant Examiner* — Maceeh Anwari
(74) *Attorney, Agent, or Firm* — Plumsea Law Group, LLC (57) ABSTRACT

A method and system for estimating an air quality condition based on vehicle data received from surrounding vehicles is disclosed. The method includes a step of determining a dynamic traffic pattern from the received vehicle data to determine a level of congestion. The method also includes a step of estimating the air quality condition based on the dynamic traffic pattern. The method and system further includes adjusting one or more settings of a cabin air control system based on the estimated air quality condition.

20 Claims, 7 Drawing Sheets

METHOD OF ESTIMATING AN AIR QUALITY CONDITION BY A MOTOR VEHICLE

BACKGROUND

The present invention relates generally to a motor vehicle, and in particular to a method for estimating an air quality condition by a motor vehicle.

Motor vehicles can be equipped with dedicated sensors for detecting an air quality condition. In addition, other methods for determining air quality conditions by a motor vehicle have been proposed. One previous method determines probable air quality deterioration ahead of a vehicle based on the vehicle's current location and previous environmental condition data gathered on the location. Another previous method disseminates air quality information gathered by vehicles equipped with environmental sensors to other vehicles not equipped with environmental sensors.

There exists a need in the art for a method of estimating an air quality condition that does not rely on a measurement from a dedicated air quality condition sensor.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of estimating an air quality condition based on received vehicle data, comprising the steps of: receiving vehicle data from a plurality of vehicles within a communication range, the vehicle data including at least one of speed, location, heading, acceleration, brake status, and number of vehicles; wherein the communication range is associated with a dedicated short range communication (DSRC) system; and estimating an air quality condition based on the received vehicle data.

In another aspect, the invention provides a method of controlling a cabin air control system in a vehicle based on received vehicle data, comprising the steps of: receiving vehicle data from a plurality of vehicles within a communication range, the vehicle data including at least one of speed, location, heading, acceleration, brake status, and number of vehicles; wherein the communication range is associated with a dedicated short range communication (DSRC) system; and operating the cabin air control system to adjust at least one setting based on an air quality condition estimated based on the received vehicle data.

In another aspect, the invention provides a system for estimating an air quality condition based on received vehicle data comprising: a dedicated short range communications (DSRC) receiver configured to receive vehicle data from a plurality of vehicles within a communication range associated with a DSRC system, the vehicle data including at least one of speed, location, heading, acceleration, brake status, and number of vehicles; and a processor configured to receive the vehicle data from the receiver and to estimate an air quality condition based on the received vehicle data.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
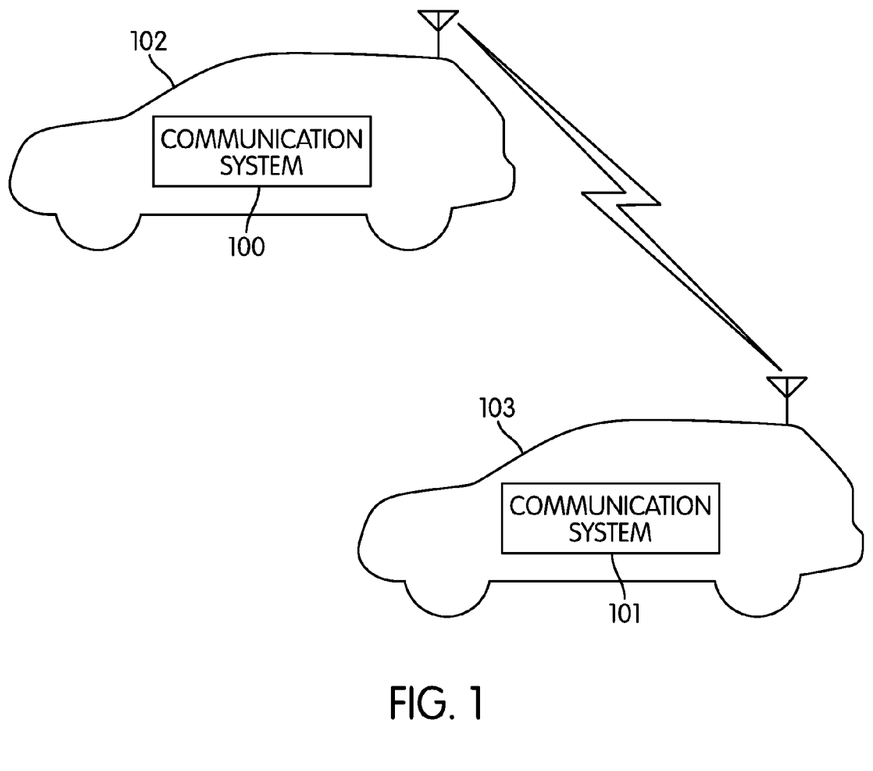
FIG. 1 is a schematic view of an embodiment of a communication system for a plurality of motor vehicles.

FIG. 1 is a schematic view of an embodiment of communication system 100 for motor vehicle 102. For purposes of clarity, only some components of a motor vehicle may be shown. Furthermore, in other embodiments, additional components may be added or removed. Communication system 100 may include provisions for communicating various kinds of information between motor vehicle 102 and any other remote source capable of exchanging information including, but not limited to: remote vehicles, roadside units as well as other remote sources. Communication system 100 may be used with one or more systems of a motor vehicle. In some embodiments, communication system 100 may be used in conjunction with a navigation system to determine the locations of other vehicles as well as the locations of traffic signals or other roadway infrastructure. In other embodiments, communication system 100 may be used with a vehicle safety system. Examples of vehicle safety systems include collision warning systems, lane departure warning systems as well as other types of safety systems. For example, a collision warning system may be configured to receive information from remote vehicles using communication system 100 to determine the locations of other vehicles and to provide alerts to a driver of any potential collisions.

In some embodiments, a plurality of vehicles may communicate using one or more communication systems. In an exemplary embodiment, motor vehicle 102 may communicate with one or more remote vehicles. In one embodiment, communication system 100 associated with motor vehicle 102 may communicate with a remote communication system 101 associated with a remote vehicle 103. Communication system 100 and remote communication system 101 may be configured to exchange vehicle data associated with motor vehicle 102 and remote vehicle 103. Vehicle data that may be exchanged may include, but is not limited to: speed, location, heading, acceleration, brake status, and other vehicle information. In different embodiments, motor vehicle 102 may communicate with any number of remote communication systems associated with remote vehicles using communication system 100.

Figure 2:
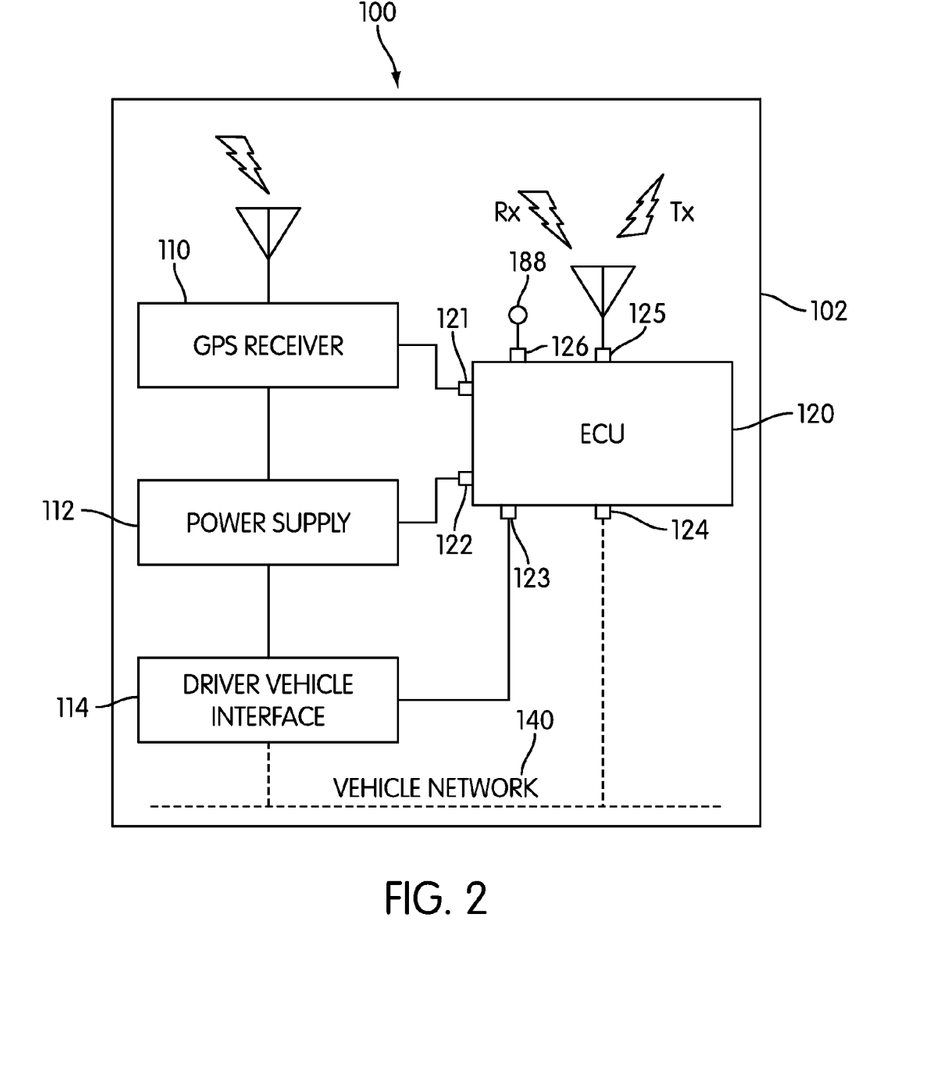
FIG. 2 is a schematic view of an exemplary embodiment of a communication system in a motor vehicle.

FIG. 2 illustrates an exemplary embodiment of a communication system associated with a motor vehicle. In this embodiment, communication system 100 associated with motor vehicle 102 is illustrated. It should be understood, however, that communication systems may be provided in other vehicles, including one or more remote communication systems associated with one or more remote vehicles, having a similar arrangement as communication system 100. In other embodiments, communication systems associated with other vehicles may include different elements and/or arrangements as communication system 100, but may be configured to communicate over communication networks with one or more communication systems having a similar arrangement as communication system 100.

Motor vehicle 102 may include provisions for receiving navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information may also include commercial information including business and restaurant names, commercial districts, shopping centers, and parking facilities. Navigation information may also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information may include one item of information, as well as a combination of several items of information.

Motor vehicle 102 may include provisions for receiving GPS information. In some embodiments, motor vehicle 102 may include GPS receiver 110. In an exemplary embodiment, GPS receiver 110 may be used for gathering GPS information for use by any systems of a motor vehicle, including, but not limited to: GPS based navigation systems. In some embodiments, GPS receiver 110 may be used for gathering additional information associated with motor vehicle 102. In an exemplary embodiment, GPS receiver 110 may provide vehicle data, including, but not limited to: speed, location, heading, acceleration, and other dynamic vehicle information.

Motor vehicle 102 may include provisions for powering one or more devices. In some cases, motor vehicle 102 may include power supply 112. Generally, power supply 112 may be any type of power supply associated with a motor vehicle. In some cases, power supply 112 may be a car battery. In other cases, power supply 112 may be another type of power supply available within motor vehicle 102. Although power supply 112 is shown as connected to some components of motor vehicle 102 in the current embodiment, it will be understood that in other embodiments additional components may be connected to power supply 112. In still other cases, some components that are shown as connected to power supply 112 may not be connected to power supply 112.

Motor vehicle 102 may include provisions for communicating with a driver. In some embodiments, motor vehicle 102 may include a driver vehicle interface 114. In some cases, driver vehicle interface 114 may include provisions for transmitting information to a driver and/or passenger. In other cases, driver vehicle interface 114 may include provisions for receiving information from a driver and/or passenger. In an exemplary embodiment, driver vehicle interface 114 may include provisions for transmitting and receiving information from a driver and/or passenger. In one embodiment, driver vehicle interface 114 may include audio and/or visual components for transmitting and receiving information from a driver and/or passenger, including, but not limited to one or more of a display, touchscreen, keyboard, speakers, microphone, and other input and/or output devices using text, graphics, icons, voice recognition, sound, speech, and other audio and/or visual indicators.

It will be further understood that in some embodiments, a driver vehicle interface may be associated directly with a navigation system of a motor vehicle. In other words, in some embodiments, a driver vehicle interface may be combined, or integrated into, a navigation system. With this arrangement, information communicated between a driver and one or more systems of a motor vehicle may be accomplished using an interface of a navigation system.

Motor vehicle 102 may include provisions for communicating, and in some cases controlling, the various components associated with motor vehicle 102. In some embodiments, motor vehicle 102 may be associated with a computer or similar device. In the current embodiment, motor vehicle 102 may include electronic control unit 120, hereby referred to as ECU 120. In one embodiment, ECU 120 may be configured to communicate with, and/or control, various components of motor vehicle 102. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports may facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that may be used, however, it should be kept in mind that not every port or provision must be used or included in a given embodiment.

In some embodiments, ECU 120 may include port 121 for communicating with GPS receiver 110. In particular, ECU 120 may be configured to receive GPS information and/or vehicle data from GPS receiver 110. In addition, ECU 120 may include port 122 for receiving power from power supply 112. Also, ECU 120 may include port 123 for communicating with driver vehicle interface 114. In particular, ECU 120 may be configured to transmit information to driver vehicle interface 114, as well as to receive information from driver vehicle interface 114.

A motor vehicle may include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicle communication network is a dedicated short range communication (DSRC) network. In some cases, DSRC networks may be configured to operate in the 5.9 GHz band with bandwidth of approximately 75 MHz. Furthermore, DSRC networks may have a range of up to approximately 1000 m.

In some embodiments, ECU 120 may include port 125 that is configured to communicate with one or more DSRC devices. In an exemplary embodiment, port 125 may be associated with a DSRC antenna that is configured to transmit and/or receive vehicle data and/or other vehicle information over one or more vehicle communication networks.

Motor vehicle 102 may include provisions for communicating with one or more components of a motor vehicle that are not associated directly, or indirectly, with motor vehicle 102. In some cases, ECU 120 may include additional ports for communicating directly with one or more additional devices of a motor vehicle, including various sensors or systems of the motor vehicle. In an exemplary embodiment, ECU 120 may include port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information that may be received via vehicle network 140 include, but are not limited to: vehicle speed, vehicle acceleration, engine speed, brake status, turning status, steering wheel angle, as well as other parameters associated with the operating condition of motor vehicle 102. In other embodiments, ECU 120 may include provisions for communicating directly with one or more sensors. In one embodiment, for example, ECU 120 may include port 126 for communicating with vehicle speed sensor 188. Vehicle speed sensor 188 may be any type of sensor known in the art for detecting a vehicle speed.

Motor vehicles associated with vehicle communication networks may be configured to exchange information. In some embodiments, motor vehicles may exchange basic safety messages (BSMs) via the vehicle communication networks. In some cases, basic safety messages may include information related to the position, dynamic motion, control and/or vehicle size of the transmitting vehicle. In one embodiment, a BSM may include information related to speed, location, heading, acceleration, brake status, and other dynamic information associated with the transmitting vehicle. In other cases, a basic safety message may include additional information. In still other cases, a basic safety message may include less information. By transmitting basic safety messages to surrounding vehicles, each vehicle may exchange information that may be useful in facilitating safety for each driver. In some cases, the information contained in a basic safety message may then be utilized by a particular vehicle to control a vehicle safety system, such as a collision warning system. In an exemplary embodiment, the information contained in a basic safety message may be utilized by a particular vehicle to control other vehicle systems, such as a cabin air control system as further described below.

Throughout this detailed discussion and in the claims, the term "message" is used to describe any collection or packet of information that is transmitted over a vehicle communication network. Messages may take the form of basic safety messages or may contain additional or less information than a basic safety message. Messages may comprise any number of bytes of information or data.

Figure 3:
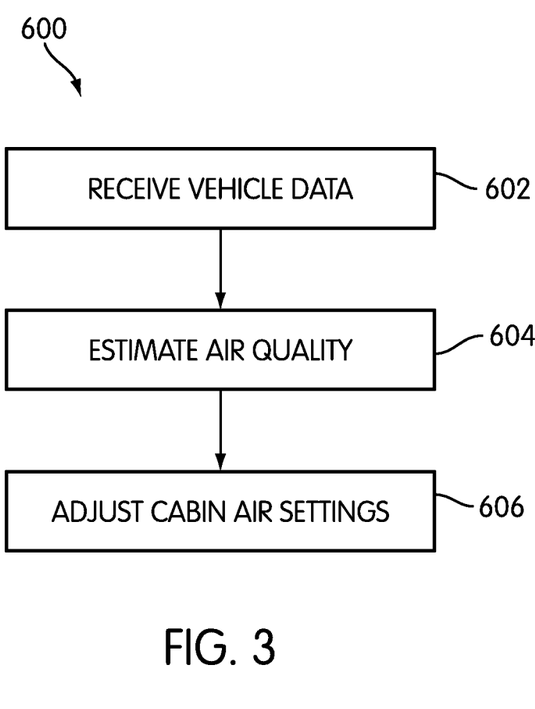
FIG. 3 is an embodiment of a process for adjusting cabin air settings based on an estimated air quality condition.
Figure 4:
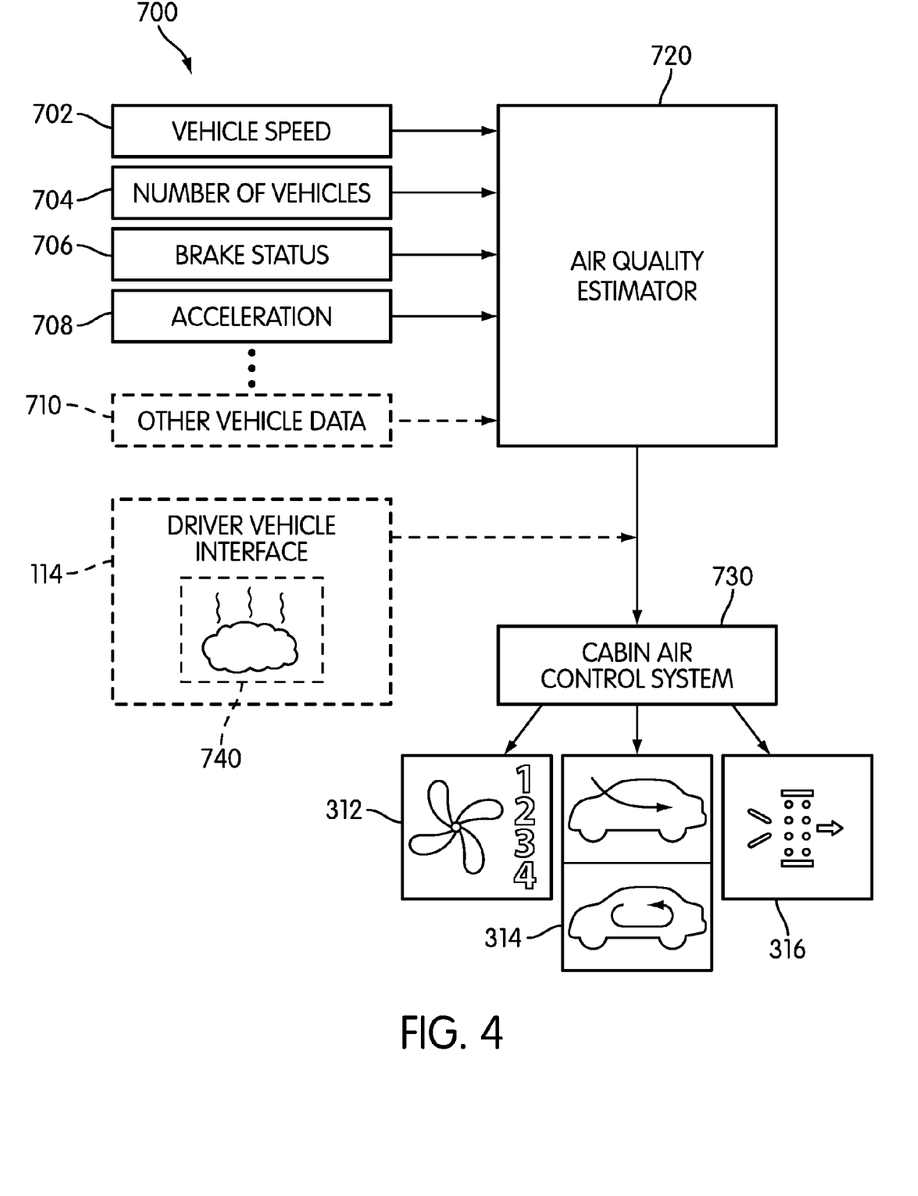
FIG. 4 is a schematic view of an embodiment of system for estimating an air quality condition and adjusting a cabin air control system.

FIGS. 3 and 4 illustrate a process 600 and a system 700 for using the vehicle data received from a plurality of vehicles over a vehicle communication network. The order of the steps described in process 600 of FIG. 3 is exemplary and may be performed in any order. As shown in FIG. 3, in some embodiments, a motor vehicle may receive vehicle data contained in messages from one or more vehicles at step 602. The motor vehicle may use the received vehicle data to estimate an air quality condition at step 604. In other embodiments, the motor vehicle additionally may use the estimated air quality condition from step 604 to operate one or more vehicle systems, including, but not limited to adjusting a setting of a cabin air control system at step 606.

Referring now to FIG. 4, a system 700 for estimating an air quality condition and adjusting a cabin air control system is illustrated. In some embodiments, a motor vehicle may receive vehicle data contained in messages from one or more vehicles. In an exemplary embodiment, the received vehicle data may include vehicle speed 702, number of vehicles 704, brake status 706, acceleration 708, and other vehicle data 710 included in the received vehicle data. In other embodiments, the received vehicle data may further include location, heading, and other dynamic vehicle data. In some embodiments, the number of vehicles 704 from which the motor vehicle receives vehicle data may be determined by a communication range of the vehicle communication network. In one embodiment, the number of vehicles 704 may be determined by the communication range associated with the DSRC network. In other cases, the number vehicles 704 may be determined by establishing a transmitting area with a specified radius around the motor vehicle. In various embodiments, the number of vehicles 704 from which the motor vehicle receives vehicle data may be adjusted by reducing or enlarging the radius of the transmitting area around the motor vehicle.

In some embodiments, the received vehicle data may be used to estimate an air quality condition. In one embodiment, motor vehicle may include an air quality estimator 720 for estimating an air quality condition. In an exemplary embodiment, air quality estimator 720 may include a processor. In some cases, air quality estimator 720 may be configured as part of communication system 100. In other cases, air quality estimator 720 may be configured as a separate component from communication system 100. In one embodiment, air quality estimator 720 may use a dynamic traffic pattern to estimate the air quality condition. In some embodiments, air quality estimator 720 may determine the dynamic vehicle pattern by associating one or more of vehicle speed 702, number of vehicles 704, brake status 706, acceleration 708, and other vehicle data 710 included in the received vehicle data, including location and/or heading, with a time period. With this arrangement, a level of congestion based on the dynamic vehicle pattern may be determined from the received vehicle data. In different embodiments, the dynamic traffic pattern may be determined based on various time periods. In some cases, the time period may be shorter to account for rapidly changing conditions. In other cases, a longer time period may be used to account for relatively stable conditions.

In other embodiments, air quality estimator 720 may use additional information with the vehicle data to determine the dynamic vehicle pattern. In one embodiment, a level of congestion may be determined for a dynamic vehicle pattern based on receiving vehicle data from less than or more than a predetermined number of vehicles within the established time period.

In some embodiments, air quality estimator 720 may estimate the air quality condition based on an association between the level of congestion determined from the dynamic traffic pattern and a level of pollutants in the air. In some embodiments, the relationship between the level of congestion and the level of pollutants in the air may be linear. With this arrangement, the level of pollutants increases in correspondence with an increase in the level of congestion. As a result, when the dynamic traffic pattern determines that there is a congested state, the air quality condition may be estimated as being associated with a high level of pollutants. Similarly, when the dynamic traffic pattern determines that there is an uncongested state, the air quality condition may be estimated as being associated with a low level of pollutants.

In some cases, the level of congestion and/or the level of pollutants may be expressed using numerical values. In other cases, one or more categories representing relative degrees of congestion and/or pollutants may be established. For example, in one embodiment, levels of congestion may be established according to an uncongested state, a moderately congested state, and a congested state. Similarly, corresponding levels of pollutants associated with estimated air quality conditions may be established, such as a low level, a moderate level, and a high level. In different embodiments, more or less categories representing levels of congestion and/or pollutants may be established.

In other embodiments, the relationship between the level of congestion and the level of pollutants in the air may be weighted. In an exemplary embodiment, the relationship between the level of congestion and the level of pollutants may be weighted based on distance. In one embodiment, vehicle data received from vehicles in closer proximity to the motor vehicle may be given a greater weight in determining the dynamic traffic pattern, level of congestion, and/or air quality condition. With this arrangement, vehicle data may be made more relevant to the location of the motor vehicle.

In another embodiment, the relationship between the level of congestion and the level of pollutants may be weighted based on the number of vehicles transmitting vehicle data. In one embodiment, vehicle data received from a larger number of vehicles may be given greater weight in determining the dynamic traffic pattern, level of congestion, and/or air quality condition. With this arrangement, the vehicle data may be made more relevant by compensating for outlier vehicle data. In different embodiments, other audio and/or visual indicators may be used to communicate the air quality condition to the driver.

In some embodiments, a motor vehicle may include one or more vehicle systems configured to use the estimated air quality condition from air quality estimator 720. In one embodiment, the estimated air quality condition may be used to adjust a cabin air control system 730. Cabin air control system 730 may be provided to operate various air conditioning and filtration components, including, but not limited to: an air conditioner, a recirculation/external air vent, an air filtration device, a fan speed controller, and other cabin air systems. Each of the various air conditioning and filtration components may have multiple settings. It should be understood that specific air conditioning and filtration components are optional and may not be included in the motor vehicle. Additionally, the motor vehicle may include other air conditioning and filtration components not shown in system 700 or the embodiments shown and described herein.

Referring again to FIG. 4, system 700 may include a cabin air control system 730 that includes a number of displays associated with air conditioning and filtration components. In this embodiment, cabin air control system 730 includes a fan speed indicator 312 configured to display fan speed settings associated with a fan speed controller. Cabin air control system 730 also may include a recirculation/external air mode indicator 314 configured to display a recirculation or external air mode setting associated with a recirculation/external air vent and an air filter mode indicator 316 configured to display an air filter mode setting associated with an air filtration device. Each of the various air conditioning and filtration components and associated settings included in cabin air control system 730 are optional and may not be included. In different embodiments, cabin air control system 730 may include other settings not shown in the embodiments or described herein.

In some embodiments, the estimated air quality condition estimated by air quality estimator 720 may be sent to other vehicle systems. In one embodiment, the estimated air quality condition may be used by driver vehicle interface 114 to communicate the air quality condition to a driver of the vehicle. In this embodiment, the air quality condition may be displayed as an icon 740 on driver vehicle interface 114. With this arrangement, the estimated air quality condition may be communicated to the driver. In some cases, the driver may then take action to adjust one or more of the settings associated with cabin air control system 730.

In some embodiments, cabin air control system 730 may be configured to adjust at least one setting based on the estimated air quality condition. In some cases, cabin air control system 730 may be configured to automatically adjust one or more settings upon receiving the estimated air quality condition from air quality estimator 720. In other cases, cabin air control system 730 may be configured to adjust one or more settings based on a command from a driver to implement the settings in response to the estimated air quality condition.

In this embodiment, cabin air control system 730 includes a plurality of settings for air conditioning and filtration components that may be adjusted based on the estimated air quality condition. In this embodiment, fan speed indicator 312 includes fan speed levels from 1 through 4, recirculation/external air mode indicator 314 includes an external air mode and a recirculation mode, and air filter mode indicator 316 includes an on mode and an off mode. With this arrangement, cabin air control system 730 may operate the air conditioning and filtration components to adjust the settings based on the estimated air quality condition being associated with different level of pollutants. In some cases, cabin air control system 730 may include programs associated with different categories of estimated air quality conditions. For example, cabin air control system 730 may include a program with a predefined combination of settings for one or more of the fan speed controller, recirculation/external air vent, and air filtration device based on each of a low level, a moderate level, and a high level of pollutants. As a result, cabin air control system 730 may adjust one or more settings to keep the air inside the interior compartment of the motor vehicle relatively free from pollutants under different estimated air quality conditions.

Figure 5:
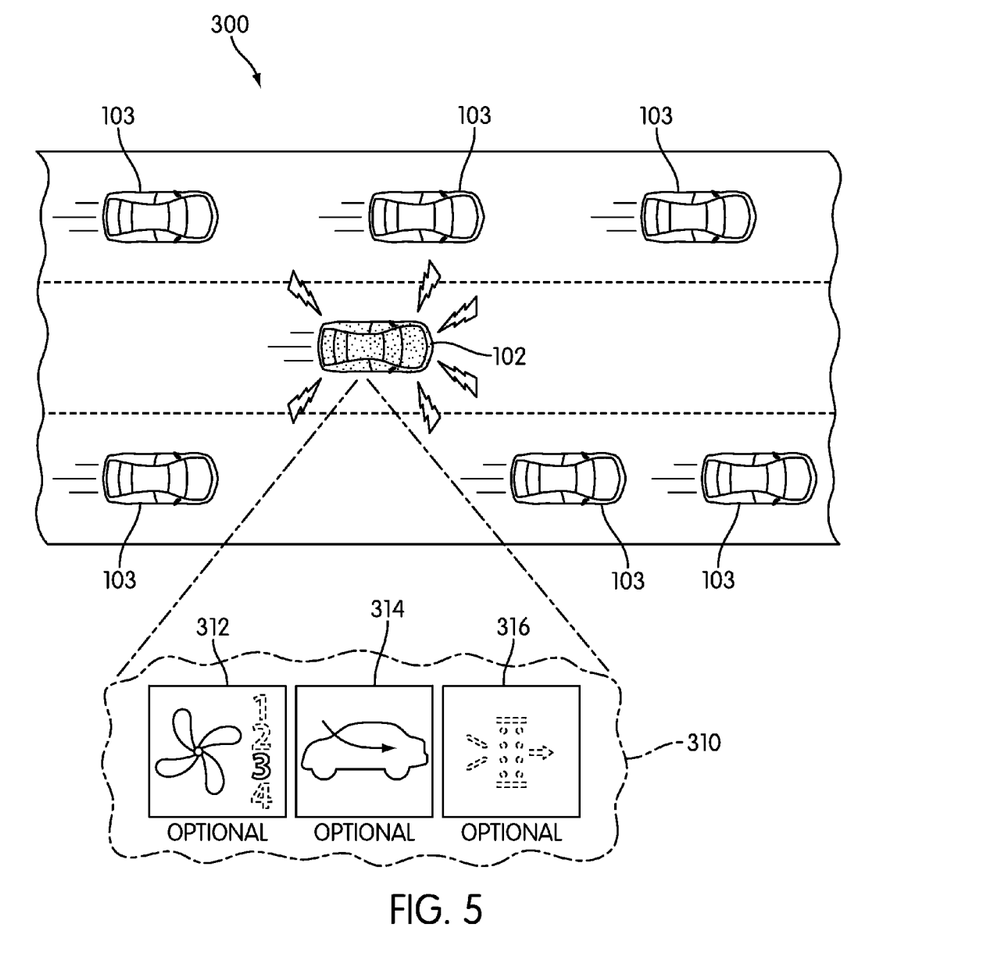
FIG. 5 is a schematic view of an embodiment of a motor vehicle receiving vehicle data from a plurality of vehicles.
Figure 6:
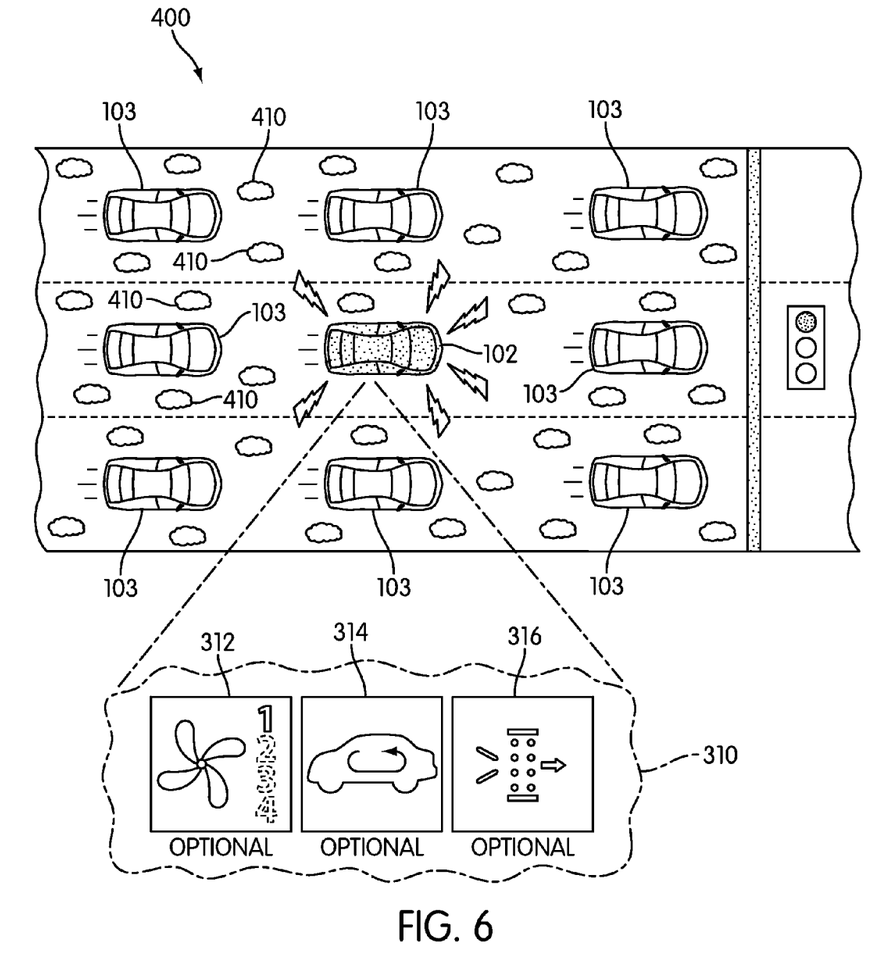
FIG. 6 is a schematic view of an embodiment of a motor vehicle in traffic congestion receiving vehicle data from a plurality of vehicles.
Figure 7:
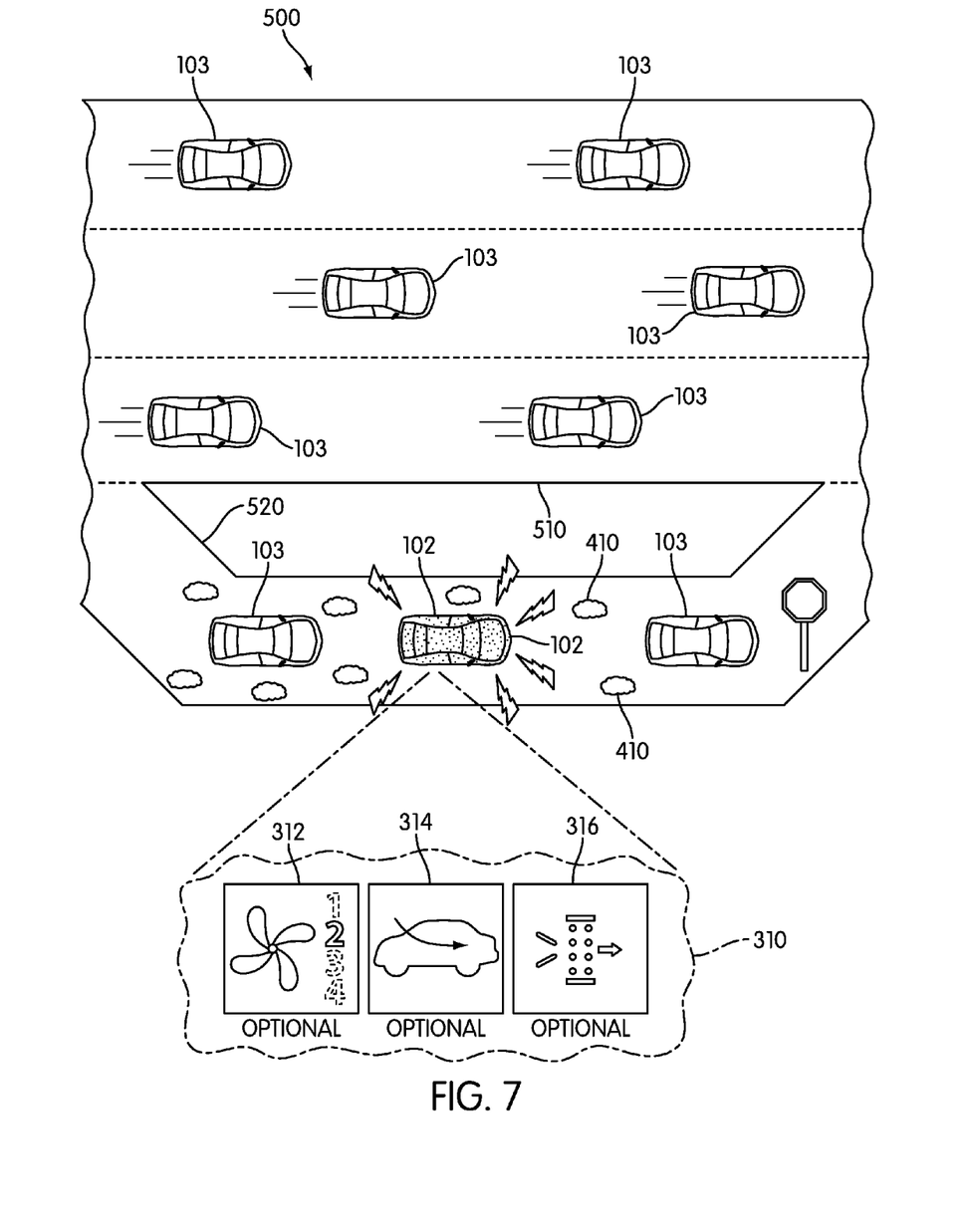
FIG. 7 is a schematic view of an embodiment of a motor vehicle on a side road receiving vehicle data from a plurality of vehicles.

FIGS. 5 through 7 illustrate exemplary scenarios of a motor vehicle traveling on a highway with different levels of congestion and receiving vehicle data from a plurality of vehicles surrounding the motor vehicle. It should be understood that the embodiments are exemplary and that an air quality condition may be estimated under different driving conditions and in other scenarios. Similarly, while in the exemplary embodiments, a cabin air control system is operated based on the estimated air quality condition, any number of different vehicle systems may use the estimated air quality condition for the purposes of controlling one or more components.

FIG. 5 illustrates an embodiment of a motor vehicle traveling along a highway and receiving vehicle data from a plurality of vehicles. In some embodiments, motor vehicle 102 may be equipped with communication system 100 configured to receive vehicle data from a plurality of remote vehicles 103. As shown in FIG. 5, motor vehicle 102 may be traveling along a highway 300. Highway 300 may include a number of other vehicles, including a plurality of remote vehicles 103 equipped with communication systems capable of communicating with motor vehicle 102. In an exemplary embodiment, plurality of remote vehicles 103 each may include a communication system for transmitting vehicle data to communication system 100 of motor vehicle 102. In one embodiment, a DSRC network may be used to transmit and receive basic safety messages between motor vehicle 102 and plurality of remote vehicles 103.

In this embodiment, motor vehicle 102 may receive messages and/or vehicle data from one or more of the plurality of remote vehicles 103 surrounding motor vehicle 102. In some embodiments, motor vehicle 102 may receive messages and/or vehicle data from a number of surrounding remote vehicles 103. In some cases, the number of surrounding remote vehicles 103 may be determined by a communication range of the vehicle communication network.

In one embodiment, the number of surrounding remote vehicles 103 may be determined by the communication range associated with the DSRC network. In other cases, the number of surrounding remote vehicles 103 may be determined by establishing a transmitting area with a specified radius around motor vehicle 102. In various embodiments, the number of surrounding remote vehicles 103 from which motor vehicle 102 receives messages and/or vehicle data may be adjusted by reducing or enlarging the radius of the transmitting area around motor vehicle 102. In the current embodiments, motor vehicle 102 is described as receiving messages and/or vehicle data, it should be understood that motor vehicle 102 also may transmit messages and/or vehicle data to one or more of the plurality of remote vehicles 103.

In FIG. 5, motor vehicle 102 is illustrated on highway 300 in an uncongested state. In this embodiment, the uncongested state of highway 300 may be associated with generally free-flowing traffic. In some embodiments, motor vehicle 102 may be provided to receive vehicle data from the plurality of surrounding remote vehicles 103 and to determine the uncongested state of highway 300. In one embodiment, communication system 100 may include a processor for determining a dynamic vehicle pattern associated with the received vehicle data from the plurality of surrounding remote vehicles 103. In some embodiments, communication system 100 may be configured to determine the dynamic vehicle pattern by associating one or more of speed, location, heading, acceleration, brake status, and other vehicle information included in the received vehicle data with a time period. With this arrangement, motor vehicle 102 may determine the uncongested state of highway 300 based on the dynamic vehicle pattern determined from the received vehicle data from the plurality of surrounding remote vehicles 103.

In other embodiments, communication system 100 may additionally use information associated with the number of surrounding remote vehicles 103 from which it has received vehicle data to determine the dynamic vehicle pattern. In one embodiment, communication system 100 may determine an uncongested state of highway 300 based on receiving vehicle data from less than a predetermined number of surrounding remote vehicles 103 within the established time period. In other embodiments, communication system 100 may use any one or more of the vehicle data to determine the dynamic traffic pattern for determining whether highway 300 is in an uncongested state. In an exemplary embodiment, communication system 100 may use one or more of speed, acceleration, and brake status to determine the average speed associated with the dynamic traffic pattern for determining whether highway 300 is in an uncongested state.

In some embodiments, communication system 100 may include one or more components for estimating an air quality condition based on the received vehicle data from the plurality of surrounding remote vehicles 103, as described in further detail in reference to FIG. 4 above. In one embodiment, the dynamic traffic pattern may be used to estimate the air quality condition of highway 300. In some embodiments, the air quality condition of highway 300 may be estimated based on an association between the level of congestion of highway 300 and a level of pollutants in the air. In the embodiment of FIG. 5, where highway 300 is in an uncongested state, the air quality condition of highway 300 may be estimated as being associated with a low level of pollutants.

In some embodiments, motor vehicle 102 may include one or more vehicle systems configured to use the estimated air quality condition. In one embodiment, motor vehicle 102 may include a cabin air control system. Cabin air control system may be provided to operate various air conditioning and filtration components, including, but not limited to: an air conditioner, a recirculation/external air vent, an air filtration device, a fan speed controller, and other cabin air systems. Each of the various air conditioning and filtration components may have multiple settings. It should be understood that specific air conditioning and filtration components are optional and may not be included in motor vehicle 102. Additionally, motor vehicle 102 may include other air conditioning and filtration components not shown in the embodiments or described herein.

Referring again to FIG. 5, motor vehicle 102 may include a cabin air control system display 310 associated with a cabin air control system. In this embodiment, cabin air control system display 310 includes a fan speed indicator 312 configured to display fan speed settings associated with a fan speed controller. Cabin air control system display 310 also may include a recirculation/external air mode indicator 314 configured to display a recirculation or external air mode setting associated with a recirculation/external air vent and an air filter mode indicator 316 configured to display an air filter mode setting associated with an air filtration device. Each of the various air conditioning and filtration components and associated settings shown on cabin air control system display 310 are optional and may not be included. In different embodiments, cabin air control system display 310 may include other settings not shown in the embodiments or described herein.

In some embodiments, the cabin air control system may be configured to adjust at least one setting based on the estimated air quality condition. In this embodiment, cabin air control system display 310 illustrates a plurality of settings for air conditioning and filtration components that may be adjusted based on the estimated air quality condition. In this embodiment, where highway 300 is in an uncongested state, the air quality condition of highway 300 may be estimated as being associated with a low level of pollutants. Accordingly, as shown in FIG. 5, cabin air control system display 310 illustrates exemplary settings for the respective air conditioning and filtration components.

In this embodiment, fan speed indicator 312 is shown with a fan speed level of 3, recirculation/external air mode indicator 314 is shown in external air mode, and air filter mode indicator 316 is shown in an off mode. With this arrangement, the cabin air control system may operate the air conditioning and filtration components to adjust the settings based on the estimated air quality condition being associated with a low level of pollutants. As a result, the air outside of motor vehicle 102 contains few pollutants and may be allowed into the interior compartment of motor vehicle 102. In addition, when the estimated air quality condition is associated with a low level of pollutants, the cabin air control system may adjust the settings of a fan speed controller to allow more air into the interior compartment of motor vehicle 102 and/or may adjust the settings of an air filtration device to turn off air filtration.

Referring now to FIG. 6, motor vehicle 102 is illustrated on highway 400 in a congested state. In this embodiment, the congested state of highway 400 may be associated with generally busy traffic. In some embodiments, motor vehicle 102 may be provided to receive vehicle data from the plurality of surrounding remote vehicles 103 and to determine the congested state of highway 400. As described above, communication system 100 may include a processor for determining a dynamic vehicle pattern associated with the received vehicle data from the plurality of surrounding remote vehicles 103. In some embodiments, communication system 100 may be configured to determine the dynamic vehicle pattern by associating one or more of speed, location, heading, acceleration, brake status, and other vehicle information included in the received vehicle data from with a time period. With this arrangement, motor vehicle 102 may determine the congested state of highway 400 based on the dynamic vehicle pattern determined from the received vehicle data from the plurality of surrounding remote vehicles 103.

In other embodiments, communication system 100 may additionally use information associated with the number of surrounding remote vehicles 103 from which it has received vehicle data to determine the dynamic vehicle pattern. In one embodiment, communication system 100 may determine a congested state of highway 400 based on receiving vehicle data from more than a predetermined number of surrounding remote vehicles 103 within the established time period. In other embodiments, communication system 100 may use any one or more of the vehicle data to determine the dynamic traffic pattern for determining whether highway 400 is in a congested state. In an exemplary embodiment, communication system 100 may use one or more of speed, acceleration, and brake status to determine the average speed associated with the dynamic traffic pattern for determining whether highway 400 is in a congested state.

In one embodiment, the dynamic traffic pattern may be used to estimate the air quality condition of highway 400. In some embodiments, the air quality condition of highway 400 may be determined based on an association between the level of congestion of highway 400 and a level of pollutants in the air. In the embodiment of FIG. 6, where highway 400 is in a congested state, the air quality condition of highway 400 may be estimated as being associated with a high level of pollutants. In one embodiment, pollutants 410 may include carbon monoxide and/or soot from engine exhaust from surrounding remote vehicles. In this embodiment, when motor vehicle 102 estimates the air quality condition based on the dynamic traffic pattern, a level of pollutants 410 may be associated with the level of congestion. In other embodiments, pollutants 410 may include other airborne contaminants produced by vehicles and/or other sources.

Referring again to FIG. 6, motor vehicle 102 may include cabin air control system display 310, with one or more of fan speed indicator 312, recirculation/external air mode indicator 314, and air filter mode indicator 316, as described above. Each of the various air conditioning and filtration components and associated settings shown on cabin air control system display 310 are optional and may not be included. In different embodiments, cabin air control system display 310 may include other settings not shown in the embodiments or described herein.

In some embodiments, the cabin air control system may be configured to adjust at least one setting based on the estimated air quality condition. In this embodiment, cabin air control system display 310 illustrates a plurality of settings for air conditioning and filtration components that may be adjusted based on the estimated air quality condition. In this embodiment, where highway 400 is in a congested state, the air quality condition of highway 400 may be estimated as being associated with a high level of pollutants 410. Accordingly, as shown in FIG. 6, cabin air control system display 310 illustrates exemplary settings for the respective air conditioning and filtration components.

In this embodiment, fan speed indicator 312 is shown with a fan speed level of 1, recirculation/external air mode indicator 314 is shown in a recirculation mode, and air filter mode indicator 316 is shown in an on mode. With this arrangement, the cabin air control system may operate the air conditioning and filtration components to adjust the settings based on the estimated air quality condition being associated with a high level of pollutants 410. As a result, because the air outside of motor vehicle 102 contains pollutants 410, the recirculation/external air vent may be adjusted to be operated in recirculation mode so as to prevent pollutants 410 from entering into the interior compartment of motor vehicle 102. In addition, when the estimated air quality condition is associated with a high level of pollutants, the cabin air control system may adjust the settings of a fan speed controller to blow less air around the interior compartment of the motor vehicle 102 and/or may adjust the settings of an air filtration device to turn on air filtration.

Referring now to FIG. 7, motor vehicle 102 is illustrated on a highway 500 with a plurality of roads in different levels of congestion. In this embodiment, highway 500 may include main road 510 and one or more side roads 520. In some cases, the level of congestion associated with each of main road 510 and side road 520 may be different. In this embodiment, main road 510 may be associated with an uncongested state with generally free-flowing traffic. Side road 520, however, may be associated with a different level of congestion. In this embodiment, side road 520 may be associated with a mildly congested state associated with generally busy or slow traffic. In other cases, the level of congestion associated with each of main road 510 and side road 520 may be substantially similar.

In some embodiments, motor vehicle 102 may be provided to receive vehicle data from the plurality of surrounding remote vehicles 103 and to determine the level of congestion of highway 500. As described above, communication system 100 may include a processor for determining a dynamic vehicle pattern associated with the received vehicle data from the plurality of surrounding remote vehicles 103. In some embodiments, communication system 100 may be configured to determine the dynamic vehicle pattern by associating one or more of speed, location, heading, acceleration, brake status, and other vehicle information included in the received vehicle data from with a time period. With this arrangement, motor vehicle 102 may determine the level of congestion associated with highway 500 based on the dynamic vehicle pattern determined from the received vehicle data from the plurality of surrounding remote vehicles 103.

In other embodiments, communication system 100 may additionally use information associated with the number of surrounding remote vehicles 103 from which it has received vehicle data to determine the dynamic vehicle pattern. In one embodiment, communication system 100 may determine a level of congestion associated with highway 500 based on receiving vehicle data from more than a predetermined number of surrounding remote vehicles 103 within the established time period. In other embodiments, communication system 100 may use any one or more of the vehicle data to determine the dynamic traffic pattern for determining the level of congestion associated with highway 500. In an exemplary embodiment, communication system 100 may use one or more of speed, acceleration, and brake status to determine the average speed associated with the dynamic traffic pattern for determining the level of congestion associated with highway 500.

In this embodiment, communication system 100 may additionally use vehicle data received from different groups of the plurality of surrounding vehicles 103 to determine separate dynamic traffic patterns associated with each lane and/or road of highway 500, including main road 510 and/or side road 520. In one embodiment, communication system 100 may determine separate dynamic traffic patterns associated with each of main road 510 and side road 520 by using a distance from motor vehicle 102. In other embodiments, communication system 100 may determine separate dynamic traffic patterns of main road 510 and side road 520 by changing a transmitting area of communication system 100. With this arrangement, vehicle data received from surrounding remote vehicles 103 may be changed to a smaller or larger area corresponding to one or more of main road 510 and/or side road 520.

In some embodiments, communication system 100 may weight vehicle data received from surrounding remote vehicles 103 based on distance from motor vehicle 102 for the purposes of determining the level of congestion. With this arrangement, vehicle data used to determine the dynamic traffic pattern may be made more relevant to the portion of highway 500 on which motor vehicle 102 is traveling. For example, in this embodiment, six remote vehicles 103 may transmit vehicle data associated with an uncongested state of main road 510 and two remote vehicles 103 may transmit vehicle data associated with a congested state of side road 520. Based on the closer surrounding remote vehicles transmitting vehicle data associated with a congested state, communication system 100 may determine a moderate level of congestion for highway 500.

In some embodiments, the vehicle data used to determine the dynamic traffic pattern may be weighted based on the number of surrounding remote vehicles 103 associated with a level of congestion of highway 500. For example, in this embodiment, six remote vehicles 103 may transmit vehicle data associated with an uncongested state of main road 510 and two remote vehicles 103 may transmit vehicle data associated with a congested state of side road 520. Based on a larger number of surrounding remote vehicles transmitting vehicle data associated with an uncongested state, communication system 100 may determine a small level of congestion for highway 500.

In different embodiments, various methods of weighting, averaging, and/or processing the vehicle data from the plurality of surrounding remote vehicles 103 may be used to determine the dynamic traffic pattern and/or to determine the level of congestion associated with a highway, a portion of a highway, and/or individual lanes or roads.

In one embodiment, the dynamic traffic pattern may be used to estimate the air quality condition of highway 500. In some embodiments, the air quality condition of highway 500 may be determined based on an association between the level of congestion of highway 500 and a level of pollutants in the air. In this embodiment, when motor vehicle 102 estimates the air quality condition based on the dynamic traffic pattern, a level of pollutants 410 may be associated with the level of congestion. In the embodiment of FIG. 7, where highway 500 includes a plurality of roads in different levels of congestion, the air quality condition of highway 500 may be estimated overall, or for each of the plurality of roads. In one embodiment, main road 510 may be associated with a low level of pollutants 410 and side road 520 may be associated with a moderate level of pollutants 410.

As described above with regard to determining the level of congestion of highway 500, main road 510, and/or side road 520, the air quality condition associated with each of highway 500, main road 510, and/or side road 520 may be estimated in a similar manner. In other words, because the air quality condition may be estimated based on the level of congestion, the air quality condition may vary based on the weighting of vehicle data used to determine the dynamic traffic pattern discussed above. In the embodiment illustrated in FIG. 7, an air quality condition associated with a moderate level of pollutants may be estimated based on the level of congestion associated with highway 500 and/or side road 520.

As shown in FIG. 7, motor vehicle 102 may include cabin air control system display 310, with one or more of fan speed indicator 312, recirculation/external air mode indicator 314, and air filter mode indicator 316, as described above. Each of the various air conditioning and filtration components and associated settings shown on cabin air control system display 310 are optional and may not be included. In different embodiments, cabin air control system display 310 may include other settings not shown in the embodiments or described herein.

In some embodiments, the cabin air control system may be configured to adjust at least one setting based on the estimated air quality condition. In this embodiment, cabin air control system display 310 illustrates a plurality of settings for air conditioning and filtration components that may be adjusted based on the estimated air quality condition. In this embodiment, where highway 500 includes a plurality of roads in different levels of congestion, the air quality condition of highway 500 and/or side road 520 may be estimated as being associated with a moderate level of pollutants 410. Accordingly, as shown in FIG. 7, cabin air control system display 310 illustrates exemplary settings for the respective air conditioning and filtration components.

In this embodiment, fan speed indicator 312 is shown with a fan speed level of 2, recirculation/external air mode indicator 314 is shown in external air mode, and air filter mode indicator 316 is shown in an on mode. With this arrangement, the cabin air control system may operate the air conditioning and filtration components to adjust the settings based on the estimated air quality condition being associated with a moderate level of pollutants 410. As a result, because the air outside of motor vehicle 102 contains a moderate amount of pollutants 410, the recirculation/external air vent may be adjusted to be operated in external air mode in combination with an air filtration device in an on mode so as to limit the number of pollutants 410 entering into the interior compartment of motor vehicle 102. In addition, when the estimated air quality condition is associated with a moderate level of pollutants, the cabin air control system may adjust the settings of a fan speed controller to blow less air around the interior compartment of the motor vehicle 102. In other embodiments, the cabin air control system may adjust the recirculation/external air vent to be operated in recirculation air mode so as to prevent pollutants 410 from entering into the interior compartment of motor vehicle 102 when any level of pollutants 410 are estimated as being present.

The principles discussed in the embodiments discussed above may be used with any object that transmits messages in any type of communication network. In some cases, the communication network could be a network with only vehicles as nodes. In other cases, however, the communication network could include other sources as nodes. For example, in another embodiment, one or more roadside units capable of communicating over a vehicle communication network can include provisions for modifying transmitting power or transmitting period in order to reduce or eliminate channel saturation.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of estimating an air quality condition based on received vehicle data via a dedicated short range communication (DSRC) network, comprising the steps of:
   receiving vehicle data from a plurality of vehicles within a communication range of a communication system associated with the DSRC network, the vehicle data including at least two or more of speed, location, heading, acceleration, and brake status for each vehicle of the plurality of vehicles;
   determining a number of vehicles for which vehicle data is received from the plurality of vehicles within the communication range; and
   estimating an air quality condition based on the received vehicle data from the plurality of vehicles within the communication range and the number of vehicles.

2. The method according to claim 1, wherein the step of estimating the air quality condition further comprises:
   determining a dynamic vehicle pattern associated with the received vehicle data from the plurality of vehicles and the number of vehicles; and
   using the dynamic vehicle pattern to estimate the air quality condition.

3. The method according to claim 2, wherein the step of determining the dynamic vehicle pattern further comprises:
   associating two or more of the speed, location, heading, acceleration, and brake status included in the received vehicle data and the determined number of vehicles with a first time period; and
   wherein the dynamic vehicle pattern is determined based on the vehicle data received within the first time period and the number of vehicles determined within the first time period.

4. The method according to claim 2, wherein the step of using the dynamic vehicle pattern to estimate the air quality condition further comprises:
   determining a first air quality condition associated with a high level of pollutants based on a congested status of the dynamic vehicle pattern.

5. The method according to claim 4, further comprising:
   determining a second air quality condition associated with a low level of pollutants based on an uncongested status of the dynamic vehicle pattern.

6. The method according to claim 1, further comprising the step of:
   operating a cabin air control system to adjust at least one setting based on the estimated air quality condition.

7. The method according to claim 6, wherein the at least one setting includes one or more of a fan speed, a recirculation/external air mode, and an air filter mode.

8. A method of controlling a cabin air control system in a vehicle based on received vehicle data via a dedicated short range communication (DSRC) network, comprising the steps of:
   receiving, by a processor in the vehicle, vehicle data from a plurality of vehicles within a communication range of a communication system associated with the DSRC network, the vehicle data including at least two of speed, location, heading, acceleration, and brake status for each vehicle of the plurality of vehicles, and number of vehicles;
   determining a number of vehicles for which vehicle data is received from the plurality of vehicles within the communication range; and
   operating the cabin air control system to adjust at least one setting based on an air quality condition estimated based on the received vehicle data from the plurality of vehicles within the communication range and the determined number of vehicles.

9. The method according to claim 1, wherein the step of operating the cabin air control system further comprises:
   estimating the air quality condition using a dynamic vehicle pattern associated with the received vehicle data from the plurality of vehicles and the number of vehicles; and
   wherein the at least one setting is adjusted based on a level of congestion of the dynamic vehicle pattern.

10. The method according to claim 9, wherein the at least one setting includes one or more of a fan speed, a recirculation/external air mode, and an air filter mode.

11. The method according to claim 9, wherein the step of estimating the air quality condition using the dynamic vehicle pattern further comprises:
    determining a first air quality condition associated with a high level of pollutants based on a congested state of the dynamic vehicle pattern; and
    determining a second air quality condition associated with a low level of pollutants based on an uncongested state of the dynamic vehicle pattern.

12. The method according to claim 11, further comprising:
    operating the cabin air control system in a recirculation mode in response to the first air quality condition.

13. The method according to claim 11, further comprising:
    operating the cabin air control system in an external air mode in response to the second air quality condition.

14. A system for estimating an air quality condition based on received vehicle data via a dedicated short range communication (DSRC) network, the system comprising:
    a dedicated short range communications (DSRC) receiver configured to receive vehicle data from a plurality of vehicles within a communication range of a communication system associated with the DSRC network, the vehicle data including at least two of speed, location, heading, acceleration, and brake status for each vehicle of the plurality of vehicles; and a processor configured to receive the vehicle data from the receiver, to determine a number of vehicles for which vehicle data is received from the plurality of vehicles within the communication range, and to estimate an air quality condition based on the received vehicle data from the plurality of vehicles within the communication range and the determined number of vehicles.

15. The system according to claim 14, wherein the processor is further configured to determine a dynamic vehicle pattern associated with the received vehicle data from the plurality of vehicles and the number of vehicles; and wherein the processor is configured to use the dynamic vehicle pattern to estimate the air quality condition.

16. The system according to claim 15, wherein the processor is further configured to determine the dynamic vehicle pattern by associating two or more of the speed, location, heading, acceleration, and brake status included in the received vehicle data and the determined number of vehicles with a first time period; and wherein the dynamic vehicle pattern is determined based on the vehicle data received within the first time period and the number of vehicles determined within the first time period.

17. The system according to claim 15, wherein the processor is further configured to determine a first air quality condition associated with a high level of pollutants based on a congested state of the dynamic vehicle pattern, and to determine a second air quality condition associated with a low level of pollutants based on an uncongested state of the dynamic vehicle pattern.

18. The system according to claim 14, further comprising:
a cabin air control system configured to adjust at least one setting based on the estimated air quality condition.

19. The system according to claim 18, wherein the at least one setting includes one or more of a fan speed, a recirculation/external air mode, and an air filter mode.

20. The system according to claim 18, wherein the cabin air control system is configured to operate in a recirculation mode in response to a first air quality condition associated with a high level of pollutants, and is configured to operate in an external air mode in response to a second air quality condition associated with a low level of pollutants.

* * * * *